United States Patent [19]
Plocher

[11] Patent Number: 5,493,932
[45] Date of Patent: Feb. 27, 1996

[54] LOCKING ARRANGEMENT FOR A SELECTOR LEVER OF A MOTOR VEHICLE TRANSMISSION

[75] Inventor: Bernd Plocher, Rottenburg, Germany

[73] Assignee: Dr. Ing. h.c.F. Porsche AG, Weissach, Germany

[21] Appl. No.: 185,889

[22] PCT Filed: Apr. 28, 1993

[86] PCT No.: PCT/EP93/01021

§ 371 Date: Mar. 28, 1994

§ 102(e) Date: Mar. 28, 1994

[87] PCT Pub. No.: WO93/24771

PCT Pub. Date: Dec. 9, 1993

[30] Foreign Application Priority Data

May 27, 1992 [DE] Germany ............ 42 17 500.3

[51] Int. Cl.⁶ .................................. B60K 41/26
[52] U.S. Cl. .................. 74/483 R; 74/475; 74/538; 192/4 A
[58] Field of Search ............ 74/475, 483 R, 74/538; 192/4 A; 335/170, 171; 477/96

[56] References Cited

U.S. PATENT DOCUMENTS 3,309,483  3/1967  Bennett et al. ............... 335/171
4,934,496  6/1990  Barske et al. ............... 192/4 A
5,003,799  4/1991  Imai et al. ............... 70/247 X
5,036,962  8/1991  Amagasa ............... 192/4 A
5,080,208  1/1992  Sakuma et al. ............... 192/4 A
5,150,593  9/1992  Kobayashi et al. ............... 70/248 X
5,181,592  1/1993  Pattock .

FOREIGN PATENT DOCUMENTS 0246353  11/1987  European Pat. Off. .
0307846  3/1989  European Pat. Off. .
3836237  5/1989  Germany .

*Primary Examiner*—Charles A. Marmor
*Assistant Examiner*—Troy Grabow
*Attorney, Agent, or Firm*—Evenson, McKeown, Edwards & Lenahan

[57] ABSTRACT

A locking arrangement on a selector lever for a motor vehicle transmission has an electromagnetic clutch which receives current from a circuit. This clutch consists of a magnetic clamp and of a check plate which can be moved about a pivot axis. When supplied with current, the check plate, when the clutch is closed, adheres to the magnetic clamp and blocks a locking pin. The locking pin is arranged transversely with respect to the selector lever and engages in an indentation of a connecting link, whereby a swivelling of the selector lever is prevented. This arrangement is small, light weight, can be integrated completely into the selector lever and can be released when a preload is exercised on the locking arrangement.

19 Claims, 5 Drawing Sheets

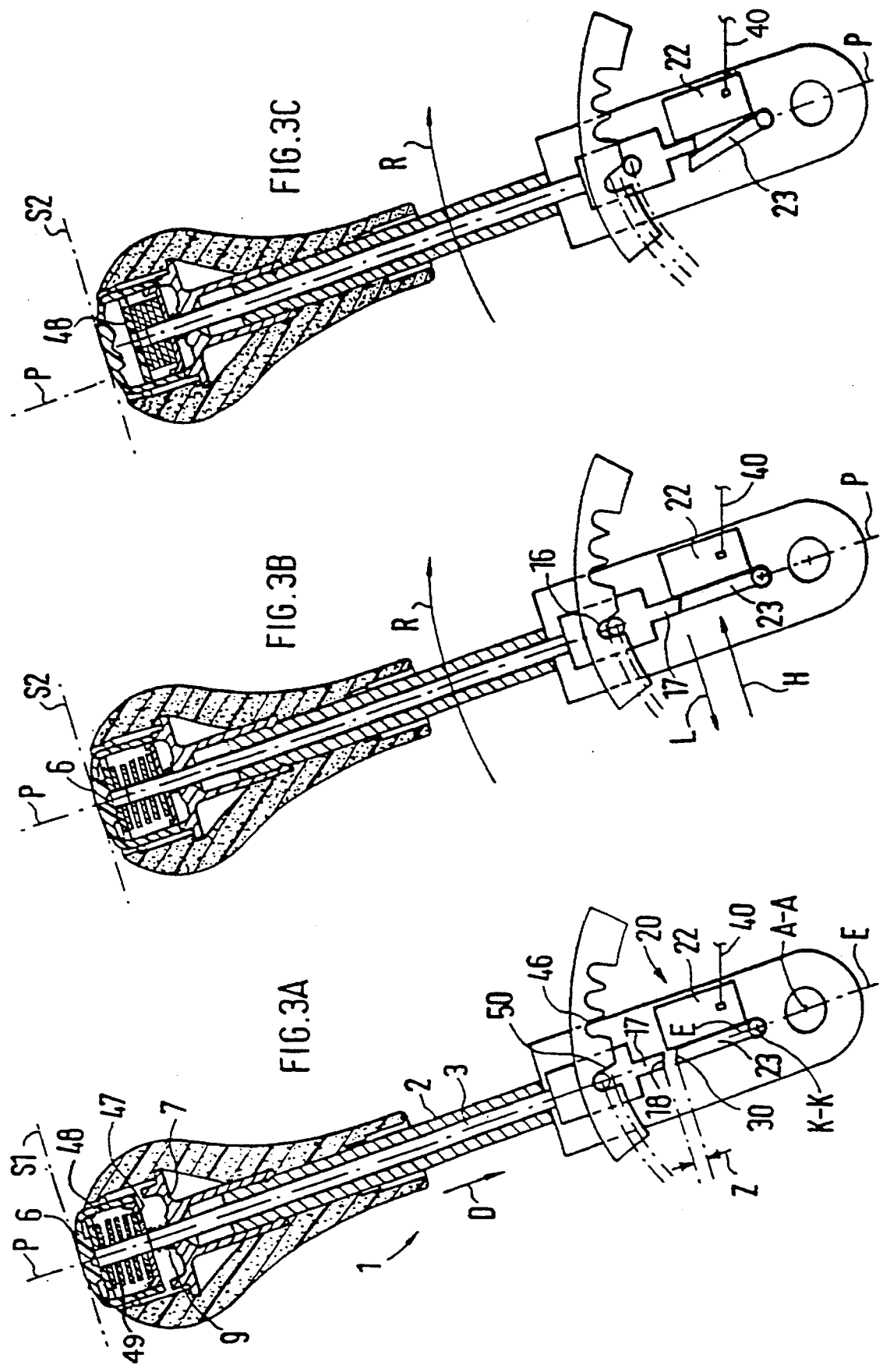

LOCKING ARRANGEMENT FOR A SELECTOR LEVER OF A MOTOR VEHICLE TRANSMISSION

The invention relates to a locking arrangement for a selector lever of a motor vehicle transmission. The locking arrangement includes a locking pin which is to be shifted manually and which is arranged to extend transversely to the selector lever which can be swivelled about an axis (A—A). The arrangement further includes a solenoid which, connected with an electronic circuit, moves a locking mechanism so as to block the locking pin and lock the selector lever.

A locking arrangement of the above-mentioned type is known from European Patent Document EP-0 307 846 A1. In this case, a selector lever, provided on its upper end with a push button that is to be operated manually, can be locked in predetermined positions. For this purpose, the selector lever is provided with a locking pin which extends transversely to the swivelling direction. The locking pin can be displaced in the axial direction of the selector lever by means of the push button, and engages in indentations of a connecting link which are assigned to the selector lever positions. In specific selector lever positions, a locking mechanism, which consists of a locking lever, is moved into the moving path of the locking pin by means of an electrically actuated lifting magnet. The selector lever is locked and cannot be swivelled because the locking pin is form-fittingly blocked in the indentation of the connecting link. A disadvantage of this type of construction is that the lifting magnet and the locking mechanism are space consuming. Furthermore, the lifting magnets required for a secure locking and unlocking are heavy and expensive.

There is therefore needed a locking low costs.

This need is met by a locking arrangement for a selector lever of a motor vehicle transmission. The locking arrangement includes a locking pin which is to be shifted manually and which is arranged to extend transversely to the selector lever which can be swivelled about an axis (A—A). The arrangement further includes a solenoid which, connected with an electronic circuit, moves a locking mechanism so as to block the locking pin and lock the selector lever. An electromagnetic clutch is arranged which consists of the solenoid constructed as the magnetic clamp and of the locking mechanism constructed as a check plate. The clutch, when it supplied with current, holds the check plate on the magnetic clamp via an electromagnetic holding force while it blocks the locking pin.

Arranging an electromagnetic clutch, which consists of a magnetic clamp and a movable check plate, on the selector lever permits a simple and compact construction of the locking arrangement. In the current-carrying condition, the check plate adheres to the magnetic clamp via an electromagnetic holding force. In this case, the locking pin of the selector lever is blocked by the check plate. The magnetic clamp is a commercially available component which is reasonable in price and, because of its small overall size, can be integrated into the selector lever. Instead of the individual magnetic clamp, a folding anchor magnet can be used as a constructional unit. The folding anchor is fastened to the magnetic clamp, acting as a check plate.

The locking arrangement is completely integrated into the selector lever and can be swivelled together with it. By use of the electronic circuit, the clutch can be closed in any selector lever position. A selector lever which is provided with this arrangement can therefore be adapted to various legal requirements as well as to different types of vehicles.

A preferred application of the present invention is use of the selector levers for automatic motor vehicle transmissions. However, this arrangement may also be used as a lock for the reverse gear of a manual transmission. Furthermore, this locking arrangement may be used in the case of selector levers which can be moved in parallel shifting channels of an H-shaped shifting system. In this case, the selector lever positions which are customary for automatic transmissions can be selected in one channel, while individual gears can be manually engaged in the parallel channel.

An advantageous further embodiment has the check plate arranged in such a manner that it can be moved about a tilting axis. When current flows through the magnetic clamp, the clutch can therefore close by means of a simple, low-friction movement about the tilting axis.

In order to generate in a simple manner a sufficiently large release force which counteracts the holding force, the check plate, or a clip connected with the locking pin, is provided in each case with an angularly arranged wedge surface, which surfaces are situated opposite one another when the clutch is closed. This angular arrangement ensures a secure unlocking, also when subjected to a preload, i.e., when a force is exercised on a push button of the selector lever that is to be manually actuated.

As a function of the respective existing constructional conditions, the tilting axis of the check plate may be arranged in parallel or perpendicular to the axis about which the selector lever can be swivelled.

Other objects, advantages and novel features of the present invention will become apparent from the following detailed description of the invention when considered in conjunction with the accompanying drawings.

BRIEF DESCRIPTION OF THE DRAWINGS

FIGS. 3B and 3C are representations of a second embodiment, which is similar to FIGS. 1A and 1B;

DETAILED DESCRIPTION OF THE DRAWINGS

Figure 1A:
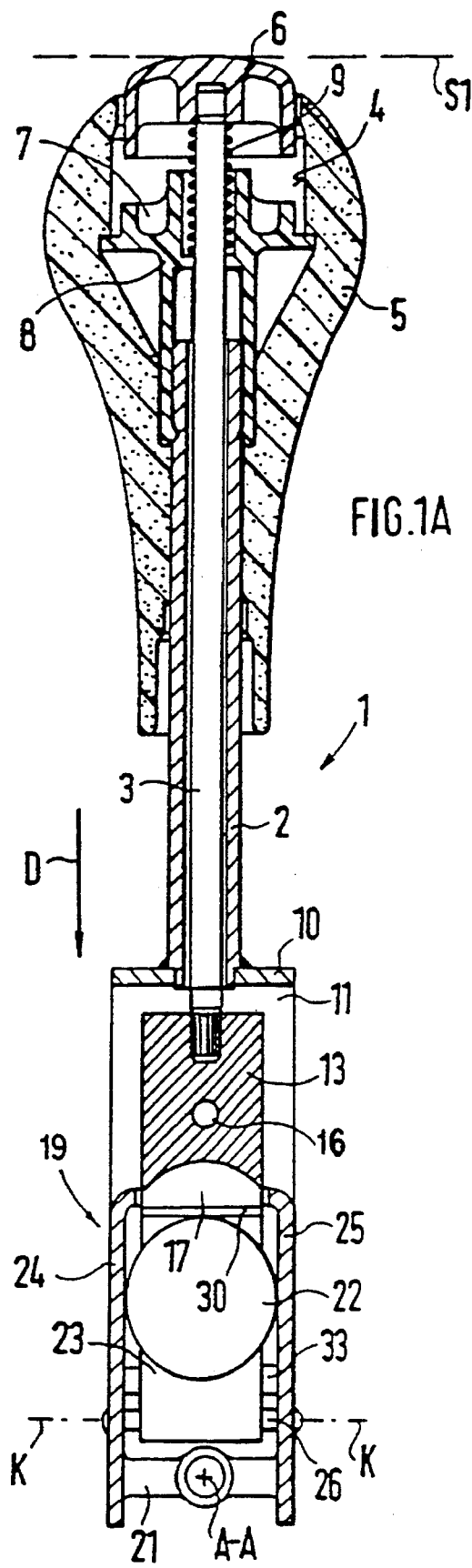
FIG. 1A is a cross sectional view of a selector lever along Line I—I according to FIG. 1B.
Figure 1B:
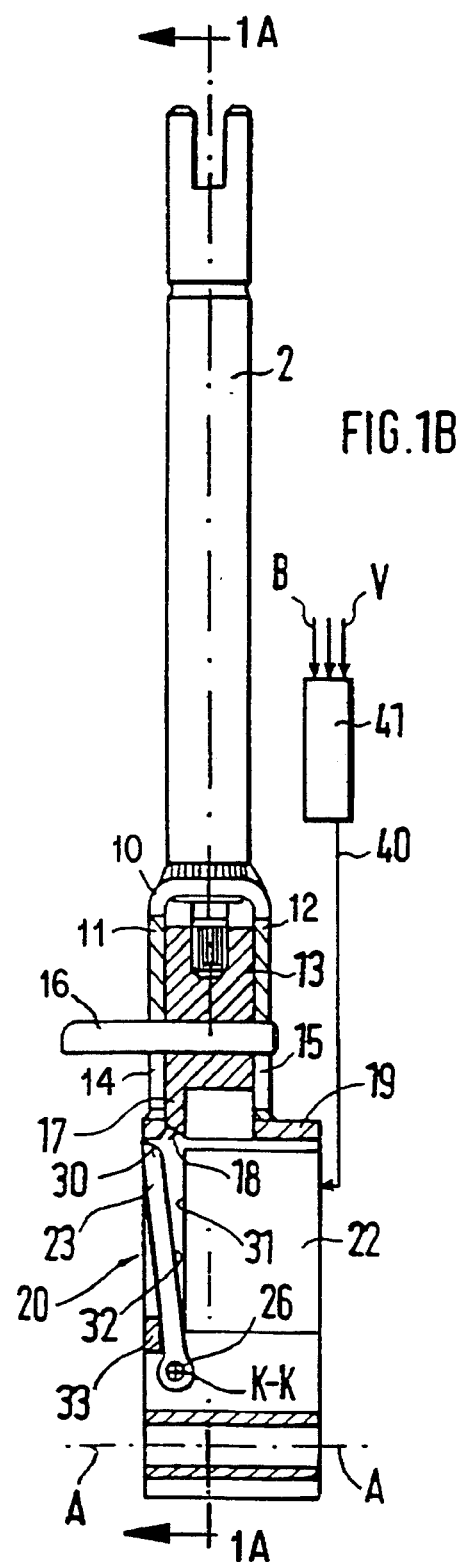
FIG. 1B is a sectional view of a selector lever.

Referring to FIG. 1 selector lever 1, which is installed in a motor vehicle (not shown), can be manually swivelled about an axis A—A and interacts with a transmission (not shown). The selector lever 1 has a tube 2 with a rod 3 which is slidably guided in the tube 2. A push button 6, which is to be manually operated and which is fixedly connected with the rod 3, is inserted into a handpiece 5 which is provided with a recess 4 on the top end and is fitted onto the tube 2. Furthermore, a sleeve 8, which is provided with a plate 7 and is penetrated by the rod 3, is pressed into the recess 4 between the handpiece 5 and the tube 2. A pressure spring 9 is supported on the plate 7, is applied to the push button 6 and holds this push button 6, in a first inoperative position S1.

The tube 2 is fitted onto a U-shaped bow 10, (FIG. 1B) between the legs 11 and 12 of which a clip 13 is guided. The clip 13 is connected with the rod 3 and can be displaced together with it into a moving direction D. A locking pin 16, which extends transversely with respect to the selector lever 1 and penetrates the two legs 11, 12 in slots 14, 15, is inserted into this clip 13. The clip 13 has a downwardly directed tongue 17. The tongue 17 is provided with an angularly arranged first wedge surface 18 on its end.

The bow 10 is fitted onto a U-shaped housing 19 which reaches around an electromagnetic clutch 20 (FIG. 1B) and has a bearing 21 on its lower end which holds the selector lever 1.

The clutch 20 is formed of a solenoid constructed as a magnetic clamp 22 and of a locking mechanism constructed as a check plate 23. This check plate 23 is movably disposed on a bolt 26 which extends between side walls 24 and 25 of the housing 19 and has a pivot axis K—K. This pivot axis K—K extends such that it is spaced away from the axis A—A at a right angle and perpendicular to the moving direction D.

On its top side facing the bow 10, the check plate 23 has an angularly arranged second wedge surface 30 which corresponds with the first wedge surface 18.

On its side facing the check plate 23, the magnetic clamp 22 is provided with an adhesive surface 31. The check plate 23 has a corresponding adhesive side 32. A stop 33, which extends in parallel to the bolt 26, limits the pivot movement of the check plate 23.

The magnetic clamp 22 is connected with an electronic circuit 41 via line 40. The circuit 41, among other functions, senses a braking signal B triggered when a foot brake of the vehicle, which is not shown, is actuated, as well as a signal V which is a function of the driving speed.

Figure 5:
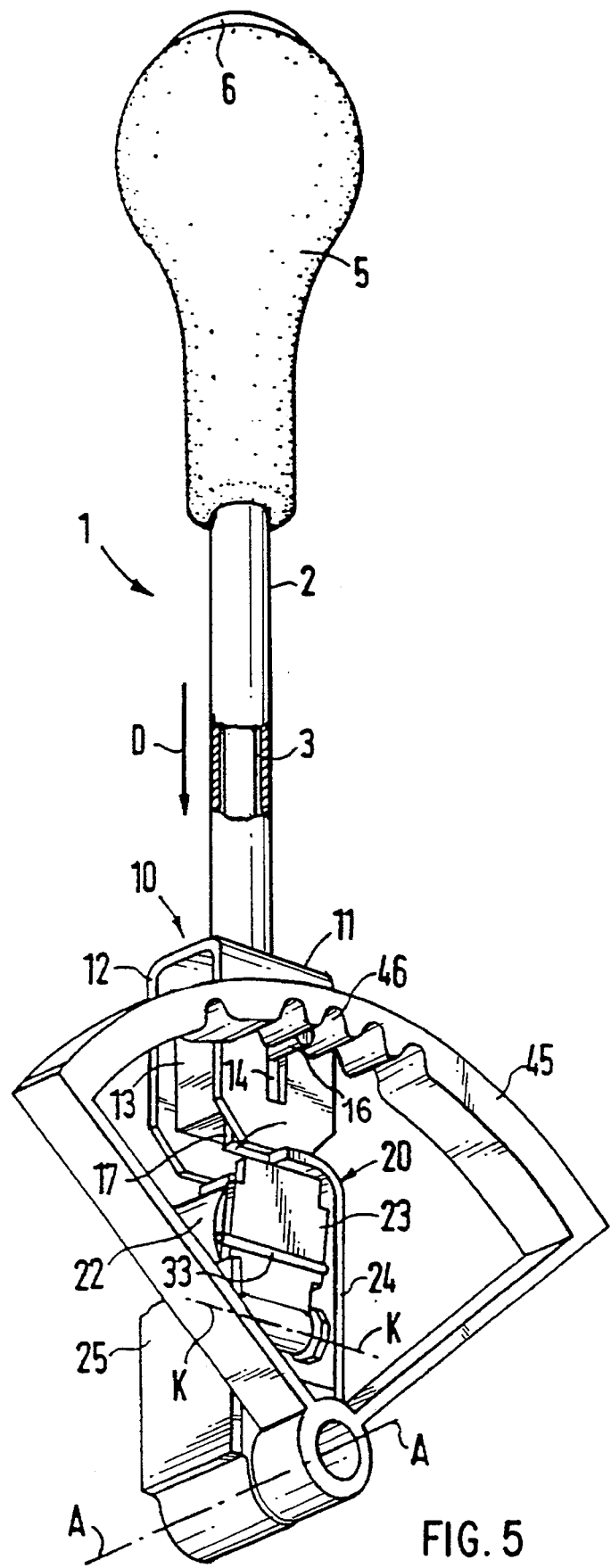
FIG. 5 is a perspective view of a locking arrangement according to the invention.

FIG. 5 illustrates the above-described selector lever 1 interacting with a connecting link 45, having detents which are assigned to the locking pin 16 and are constructed as indentations 46. The connecting link 45 is stationarily arranged in the motor vehicle. The indentations 46 are assigned to predetermined positions of the selector lever 1. For illustrating the arrangement, the lateral wall 25 is shown in a partially broken-away manner.

FIGS. 2, 3 and 4 are schematic views of different embodiments of the invention. For a better understanding of the method of operation, in each case, the clutch 20 is illustrated rotated by 90°. In this case, the pivot axis K—K extends in parallel to the axis A—A. The two axes A—A and K—K are situated in a plane E—E which is parallel to the moving direction D.

Figure 2A:
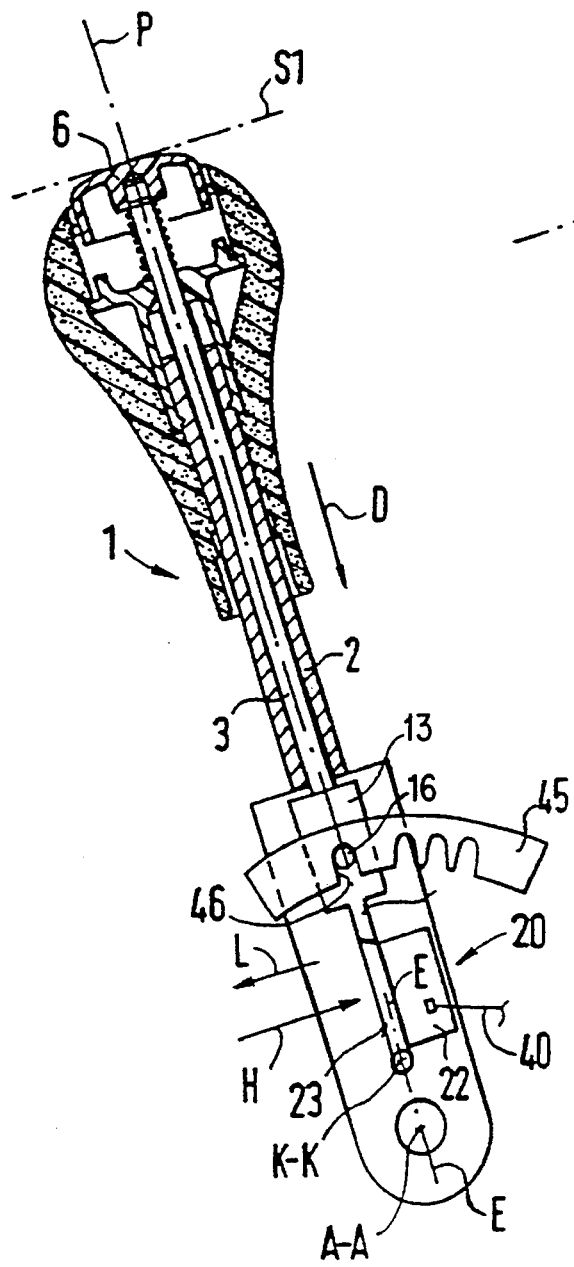
FIGS. 2A and 2B are schematic partially sectional views of a first embodiment of the invention, having a clutch that is illustrated while being rotated by 90°.
Figure 2B:
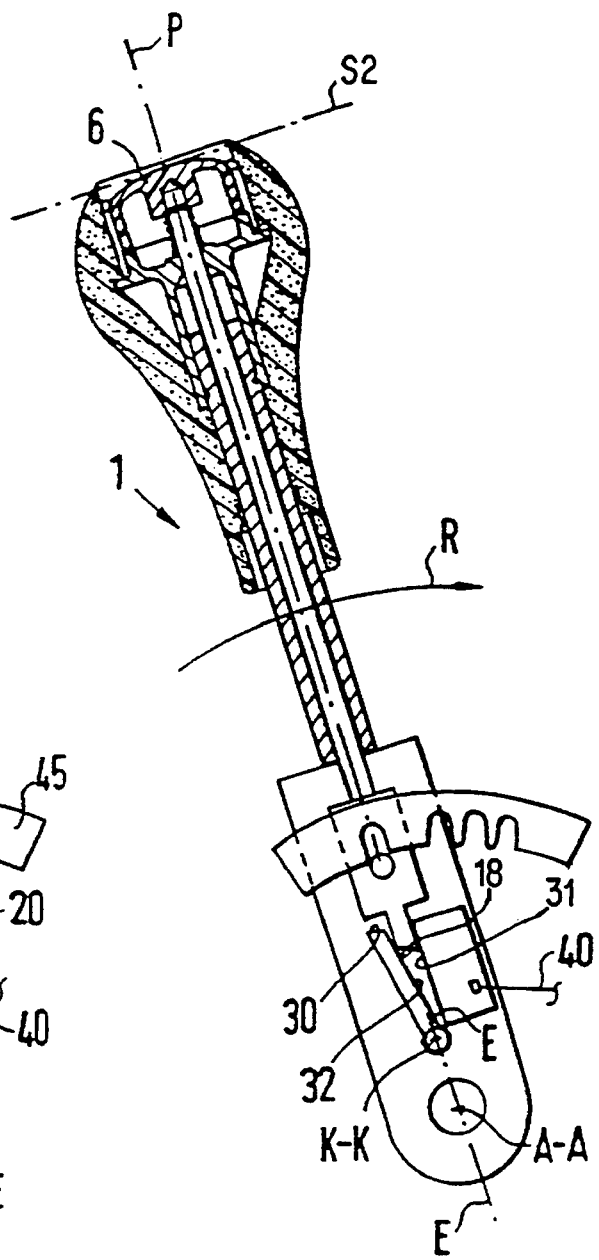

The first embodiment illustrated in FIGS. 2A and 2B shows the selector lever 1 in a position P, in which the transmission is held in a parking position.

The magnetic clamp 22 receives current from the circuit 41 and causes an electromagnetic holding force H which acts vertically upon the magnetic clamp 22 and holds the adhesive side 32 of the check plate 23 in contact with the adhesive surface 31. The push button 6 is in position S1, and the pressure spring 9 holds, by way of the rod 3, the locking pin 16 in the indentation 46 assigned to position P.

The push button 6 cannot be pressed manually into an actuated second position S2 because the tongue 17 is blocked by the check plate 23. Thus, the selector lever 1 is locked in position P.

A force acting in the moving direction D upon the push button 6 causes, by way of the angular arrangement of the wedge surfaces 18 and 30, a releasing force L which acts upon the check plate 23. The releasing force L is smaller than the holding force H and acts oppositely with respect to it.

When the braking signal B is also present at the circuit 41, the current supplied by way of line 40 is interrupted and the holding force H is eliminated. According to FIG. 2B, the push button 6 moves in the position S2, in which case the tongue 17, which has slid into direction D, moves the check plate 23 about the pivot axis K—K such that the tongue 17 wedges between the adhesive surface 31 and the adhesive side 32. The locking pin 16 is disengaged from the indentation 46 having the parallel flanks. When the push button 6 is actuated, the selector lever 1 can be rotationally swivelled about the axis A—A in the moving direction R.

When the clutch 20 or the circuit 41 fails, the pivotability of the selector lever 1 and the detent, which is achieved between the locking pin 16 and the indentation 46, is maintained.

The second embodiment of the invention illustrated in FIGS. 3A to 3C has a push button 6 which is movable with respect to the rod 3. A coil spring 49 is supported between a bottom 47 of the push button 6 and a spring plate 48 fastened to the rod 3. The pressure spring 9 acts between the plate 7 and the bottom 47.

The indentation 46 is provided with a diagonal flank 50. In the current-energized state of the clutch 20, the selector lever 1 is locked. The wedge surfaces 18 and 30 have a distance Z from one another.

In order to leave the position P, according to FIG. 3B, the push button 6 is pressed against the pressure spring 9 into position S2. In this case, the locking pin 16 is displaced by the extent Z in the direction D. The wedge surfaces 18 and 30 are thus directly opposite one another in a no-contact fashion. Further pressing of the push button 6 is not possible because the push button 6 rests on the plate 7. By actuating the foot brake, the signal B interrupts the current supply to the magnetic clamp 22. The selector level can then leave position P by pulling on the selector lever in the direction R. In this case, the locking pin 16 is displaced in the direction D while it slides on the flank 50 and releases the check plate 23. By means of this displacement, the coil spring 49 is braced between the bottom 47 and the spring plate 48. Further actuating of the push button 6 is not required. According to FIG. 3C, the selector lever 1 is shown leaving position P.

Unauthorized use of the locking arrangement according to FIG. 3 such that, while the push button 6 is pressed continuously in position S2, the selector lever 1 can be swivelled into arbitrary positions and the clutch 20 can therefore not close because of the tongue 17 which stands in front of the magnetic clamp 22, is impossible. This is because by actuating the push button, only the distance Z between the wedge surfaces 18, 30 can be overcome. As soon as another indentation 46 of the connecting link 45 has been reached, the coil spring 49 shifts the tongue 17 against the direction D to an extent such that the clutch 20 can close independently of actuating the push button.

Furthermore, in the case of this embodiment, it is also advantageous that the clutch 20 can also open when a force acts upon the selector lever 1 in the direction R. This occurs when, while the existence of the locking arrangement is not known, a pulling on the selector lever 1 takes place by means of this force in order, for example, to leave the locked position P when the foot brake is not actuated. If then, while the force continues to act, the signal B is triggered, the releasing force L, which acts by way of the flank 50 upon the locking pin 16 and thus upon the check plate 23, causes an immediate opening of the clutch 20.

Figure 4A:
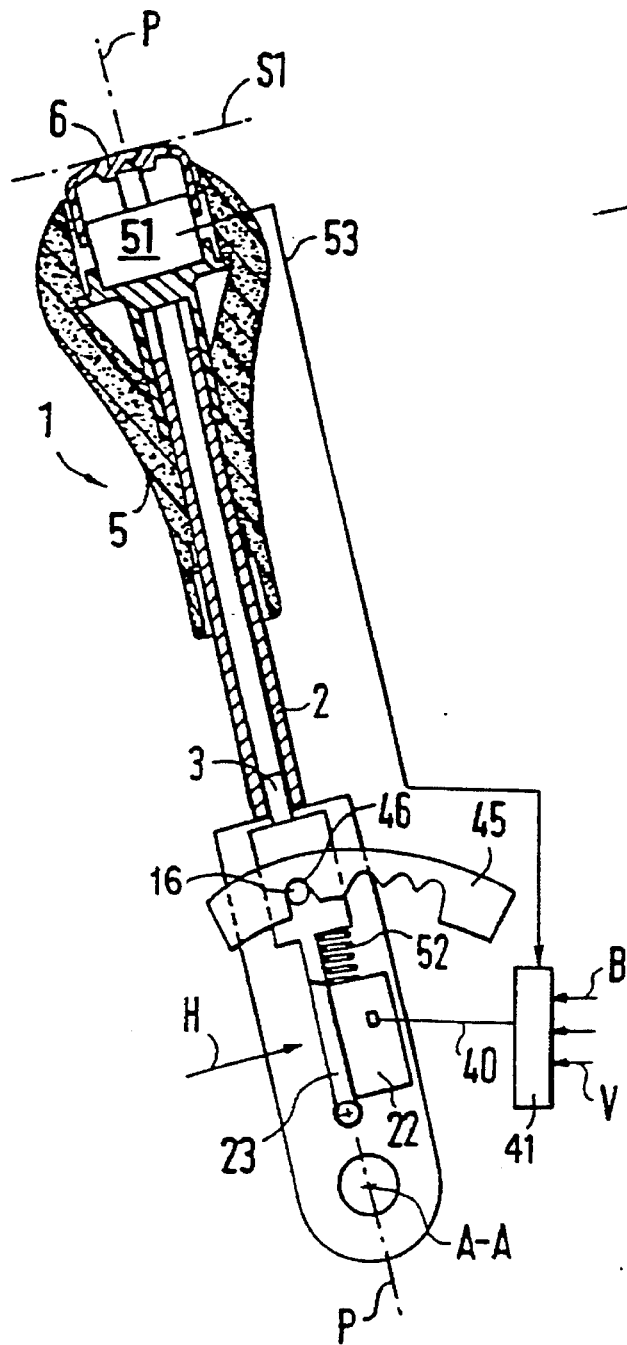
FIGS. 4A and 4B are representations of a third embodiment, which is similar to FIGS. 1A and 1B.
Figure 4B:
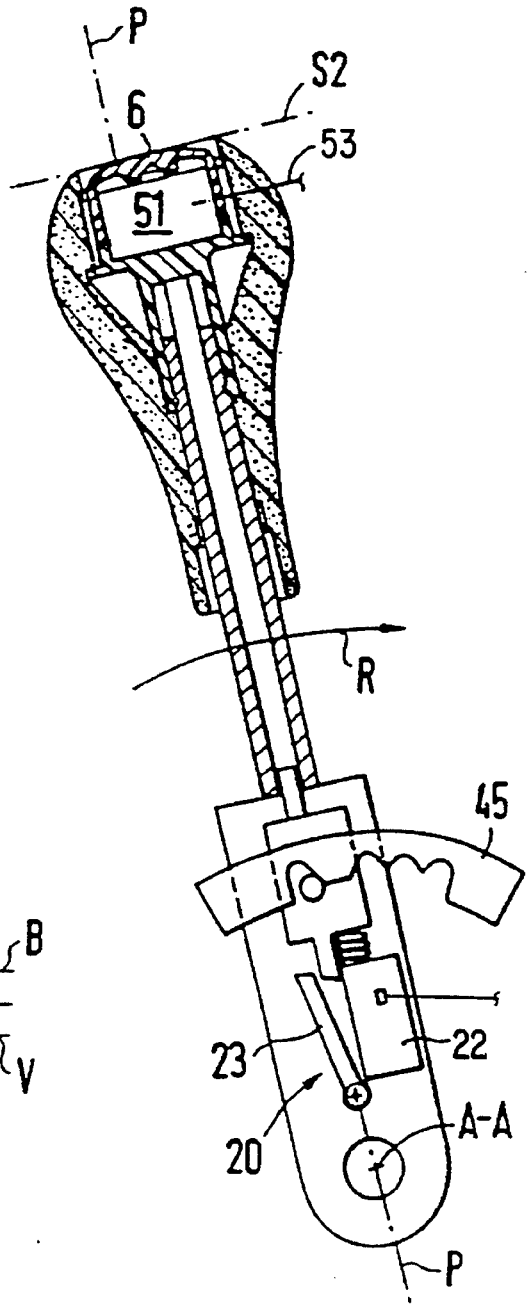

The third embodiment according to FIGS. 4A and 4B has an electric switch 51 fastened on the plate 7 which is actuated by the push button 6. The rod 3 is designed to be short and is used only for guiding the clip 13 in the tube 2.

A pressure spring 52 is arranged between the magnetic clamp 22 and the clip 13. The switch 51 is connected with the circuit 41 by way of a line 53.

When the motor vehicle is ready for driving, the magnetic clamp 22 is always supplied with current. Pressing the push button 6 into position S2 triggers a signal by way of switch 51 which is transmitted by way of line 53 and interrupts the current supply. The pressure spring 52 holds the locking pin 16 in the indentation 46. In position P of the selector lever 1, the braking signal B is also required for the interruption of the current supply. Subsequently, the selector lever 1 can be pivoted in the direction R, in which case, by means of flank 50, the clip 13 according to FIG. 4B is displaced while opening the clutch 20.

Because the mechanical connection between the push button 6 and the clip 13 is eliminated, an arbitrary design of the selector lever 1 is possible.

All embodiments have the common advantage that they have a secure unlocking effect when a preload is exercised on the locking arrangement which is entered by way of the push button 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for a selector lever of a motor vehicle transmission, the selector lever being swivellable about a first axis, comprising:

a locking pin which is manually shifted, said locking pin extending transverse to the selector lever;

an electromagnetic clutch which includes a solenoid constructed as a magnetic clamp and which includes a check plate constructed as a locking mechanism;

an electronic circuit connected to said solenoid, said solenoid moving said locking mechanism such that the locking mechanism blocks the locking pin from shifting and locks the selector lever; and wherein said clutch holds the check plate on the magnetic clamp via an electromagnetic holding force generated via an electric current supplied to said clutch in order to block the locking pin from shifting.

2. An arrangement according to claim 1, wherein the check plate is arranged in a movable manner on a second pivot axis arranged adjacent to the magnetic clamp.

3. An arrangement for a selector lever of a motor vehicle transmission, the selector lever being swivellable about a first axis, comprising:

a locking pin which is manually shifted, said locking pin extending transverse to the selector lever;

an electromagnetic clutch which includes a solenoid constructed as a magnetic clamp and which includes a check plate constructed as a locking mechanism;

an electronic circuit connected to said solenoid, said solenoid moving said locking mechanism such that the locking mechanism blocks the locking pin from shifting and locks the selector lever;

wherein said clutch holds the check plate on the magnetic clamp via an electromagnetic holding force generated via an electric current supplied to said clutch in order to block the locking pin from shifting; and wherein the locking pin, via a clip displaceable together with the locking pin and provided with a first wedge surface, is brought to rest against a corresponding second wedge surface of the check plate, the first and second wedge surfaces being angularly arranged causing a release force directed against the holding force.

4. An arrangement according to claim 3, wherein the second pivot axis is arranged to extend in parallel to the first axis.

5. An arrangement according to claim 3, wherein the second pivot axis and the first axis are arranged in a plane which extends in parallel to a moving direction of the locking pin.

6. An arrangement according to claim 3, wherein the second pivot axis is arranged to extend at a right angle with respect to the first axis.

7. An arrangement according to claim 6, wherein the first axis is arranged to extend perpendicularly to a moving direction of the locking pin.

8. An arrangement according to claim 4, wherein the locking pin is manually displaceable via a push button, said locking pin being operatively arranged inside an indentation of a connecting link fixed to the vehicle, which indentation acts as a detent and has parallel flanks.

9. An arrangement according to claim 6, wherein the locking pin is manually displaceable via a push button, said locking pin being operatively arranged inside an indentation of a connecting link fixed to the vehicle, which indentation acts as a detent and has parallel flanks.

10. An arrangement according to claim 8, wherein when the push button is pressed into an actuated second position, a tongue of the clip wedges between the check plate and the magnetic clamp of the clutch, and the locking pin is arranged to be disengaged from the connecting link.

11. An arrangement according to claim 9, wherein when the push button is pressed into an actuated second position, a tongue of the clip wedges between the check plate and the magnetic clamp of the clutch, and the locking pin is arranged to be disengaged from the connecting link.

12. An arrangement according to claim 4, wherein the locking pin can be manually displaced by means of a push button and, when the push button is pressed into an actuated second position, the first wedge surface is arranged in a non-contacting manner directly adjacent to the second wedge surface, wherein the locking pin rests against an oblique flank of an indentation of a connecting link fixed to the vehicle, which indentation acts as a detent.

13. An arrangement according to claim 6, wherein the locking pin can be manually displaced by means of a push button and, when the push button is pressed into an actuated second position, the first wedge surface is arranged in a non-contacting manner directly adjacent to the second wedge surface, wherein the locking pin rests against an oblique flank of an indentation of a connecting link fixed to the vehicle, which indentation acts as a detent.

14. An arrangement according to claim 12, wherein when the selector lever is swivelled about the first axis, the locking pin rests slidingly against the flank and causes a releasing force.

15. An arrangement according to claim 13, wherein when the selector lever is swivelled about the first axis, the locking pin rests slidingly against the flank and causes a releasing force.

16. An arrangement according to claim 4, wherein when the clutch is closed, the locking pin is held, via a pressure spring applied to the clip, in an indentation of a connecting link fixed to the vehicle, which indentation acts as a detent.

17. An arrangement according to claim 6, wherein when the clutch is closed, the locking pin is held, via a pressure spring applied to the clip, in an indentation of a connecting link fixed to the vehicle, which indentation acts as a detent.

18. An arrangement according to claim 16, wherein a switch, which is connected with the circuit by way of a line, is manually actuated and interrupts the current supply to the clutch in the actuated position, said switch being arranged on the selector lever.

19. An arrangement according to claim 17, wherein a switch, which is connected with the circuit by way of a line, is manually actuated and interrupts the current supply to the clutch in the actuated position, said switch being arranged on the selector lever.

* * * * *